(12) United States Patent
Chen et al.

(10) Patent No.: US 11,882,349 B2
(45) Date of Patent: Jan. 23, 2024

(54) LARGE-FIELD-OF-VIEW HIGH-RESOLUTION IMAGING DEVICE

(71) Applicant: NORTH UNIVERSITY OF CHINA, Taiyuan (CN)

(72) Inventors: Ping Chen, Taiyuan (CN); Sukai Wang, Taiyuan (CN); Yihong Li, Taiyuan (CN); Yan Han, Taiyuan (CN); Jinxiao Pan, Taiyuan (CN); Bin Liu, Taiyuan (CN); Jiaotong Wei, Taiyuan (CN); Huihua Kong, Taiyuan (CN); Jian Wang, Taiyuan (CN); Xinyan Su, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 245 days.

(21) Appl. No.: 17/546,306

(22) Filed: Dec. 9, 2021

(65) Prior Publication Data

US 2022/0103729 A1 Mar. 31, 2022

Related U.S. Application Data

(63) Continuation of application No. PCT/CN2020/140447, filed on Dec. 29, 2020.

(30) Foreign Application Priority Data

Jan. 7, 2020 (CN) .......................... 202010012988.9

(51) Int. Cl.
*H04N 23/55* (2023.01)
*G03B 42/02* (2021.01)
(Continued)

(52) U.S. Cl.
CPC ............ *H04N 23/55* (2023.01); *G03B 42/02* (2013.01); *H04N 23/54* (2023.01); *H04N 25/60* (2023.01)

(58) Field of Classification Search
None
See application file for complete search history.

(56) References Cited

U.S. PATENT DOCUMENTS

| 5,313,542 A | 5/1994 | Castonguay |
| 6,115,556 A | 9/2000 | Reddington |

(Continued)

FOREIGN PATENT DOCUMENTS

| CN | 2441277 Y | 8/2001 |
| CN | 1887227 A | 1/2007 |

(Continued)

OTHER PUBLICATIONS

International Search Report for International Application PCT/CN2020/140447, dated Mar. 25, 2021.
(Continued)

*Primary Examiner* — Mark T Monk
(74) *Attorney, Agent, or Firm* — Reising Ethington P.C.

(57) ABSTRACT

A large-field-of-view high-resolution imaging device includes an imaging array formed by splicing and combining a plurality of imaging units and a CSI phosphor screen. Each imaging unit is formed by coupling an array of light cones in series and an enhanced CCD. The series light cone array is formed by connecting a large light cone and a small light cone in series such that a small end face of the large light cone is connected with a large end face of the small light cone, a large end face of the large light cone is attached to the CSI phosphor screen, and a small end face of the small light cone serves as an input window of an image enhancer. The enhanced CCD is formed by coupling the image enhancer and a CCD camera. A photosensitive screen of the CCD camera serves as an output window of the image enhancer.

9 Claims, 2 Drawing Sheets

(51) Int. Cl.
H04N 23/54 (2023.01)
H04N 25/60 (2023.01)

(56) References Cited

U.S. PATENT DOCUMENTS 7,006,741 B1 2/2006 Yu
2018/0313963 A1* 11/2018 Shirakawa .............. G01T 1/202

FOREIGN PATENT DOCUMENTS

| CN | 101443911 A | 5/2009 |
| CN | 201331653 Y | 10/2009 |
| CN | 102547150 A | 7/2012 |
| CN | 102621164 A | 8/2012 |
| CN | 203503597 U | 3/2014 |
| CN | 111193851 A | 5/2020 |
| EP | 0468570 A1 | 1/1992 |

OTHER PUBLICATIONS

Wang et al., Research on Portable Digital X-ray Optical Fiber Taper Coupling to CCD Imaging System, Transducer and Microsystem Technologies, Sep. 30, 2007, vol. 26.
First Office Action issued in corresponding CN Application 202010012988.9, dated Dec. 7, 2020, and an English translation.
Second Office Action issued in corresponding CN Application 202010012988.9, dated Jul. 9, 2021, and an English translation.

* cited by examiner

LARGE-FIELD-OF-VIEW HIGH-RESOLUTION IMAGING DEVICE

CROSS-REFERENCE TO RELATED APPLICATIONS

The present application is a bypass continuation of International Patent Application PCT/CN2020/140447 filed on Dec. 29, 2020, which claims priority to Chinese Patent Application No. 202010012988.9 filed on Jan. 7, 2020. The disclosure of each of the above-referenced patent applications is incorporated by reference as if fully set forth in its entirety.

TECHNICAL FIELD

The present application relates to the technical field of image capturing processing, and in particular to, a large-field-of-view high-resolution imaging device.

BACKGROUND ART

With the development of a photoelectric imaging technology, in order to acquire target image information of a larger spatial range and more spatial details, a photoelectric imaging system is gradually developing towards a large field of view and high resolution.

For a single optical system, a gross information content is determined by the number of pixels of an imaging chip. Once the gross information content is determined, the field of view and the resolution become a pair of contradictory parameters, i.e., the field of view and the resolution of the optical system cannot be improved simultaneously. In general, the resolution of a large-field-of-view optical system is often low while the field of view of a high-resolution optical system is often small. Therefore, solving the contradiction between the field of view and the resolution and achieving large-field-of-view and high-resolution imaging is a current research hotspot in the field of optics. A large-field-of-view high-resolution optical system has broad application prospects in military and civilian fields such as space remote sensing, aerial reconnaissance, security monitoring, astronomical observation, and cultural relics protection.

SUMMARY OF THE INVENTION

In view of this, an embodiment of the present application provides a large-field-of-view high-resolution imaging device, which reduces image distortion, enhances image brightness and contrast, improves image resolution, and expands an imaging field of view.

An embodiment of the present application provides a large-field-of-view high-resolution imaging device, which includes: an imaging array formed by splicing and combining a plurality of imaging units and a Cesium Iodide (CsI) phosphor screen. Each imaging unit is formed by coupling a series light cone array (i.e., an array of light cones in series) and an enhanced Charge Coupled Device (CCD).

The series light cone array is configured to conduct an optical signal and formed by connecting a large light cone and a small light cone in series, a small end face of the large light cone is connected with a large end face of the small light cone in series, a large end face of the large light cone is attached to the CsI phosphor screen, and a small end face of the small light cone serves as an input window of an image enhancer.

The enhanced CCD is formed by coupling the image enhancer for increasing detection efficiency and improving image brightness and contrast, and a CCD camera for converting the optical signal into an electrical signal and storing imaging information in the form of a digital signal, and a photosensitive screen of the CCD camera serves as an output window of the image enhancer.

It can be seen from the above-described technical solution that the embodiment of the present application provides a large-field-of-view high-resolution imaging device, which increases light transmittance, reduces image geometric distortion, and improves image resolution by connecting a large light cone and a small light cone in series to form an array of light cones in series. An imaging unit is formed by coupling an array of light cones in series to an enhanced CCD, which compensates for brightness decrease caused by the reduction of phosphor transmittance and increases image brightness and contrast. Large-field-of-view and high-resolution imaging is achieved by splicing a plurality of imaging units. The resolution is higher, and the field of view is larger compared to a mode of directly coupling large light cones to a camera.

DETAILED DESCRIPTION OF EMBODIMENTS

In order to more fully clarify the objects, technical solutions, and advantages of the present application, the present application will be described in detail hereinafter with reference to the accompanying drawings and specific embodiments.

In the related art, an imaging mode of directly coupling large light cones to a camera is generally used, and the large light cones are arranged in a light cone array to achieve large-field-of-view imaging.

However, since a light cone has a large-area large end and a small-area small end, the taper ratio of the light cone is large, and an edge monofilament cortex is too thin, thereby causing light leakage and reducing the overall light transmittance of the light cone. Moreover, since the taper ratio of the light cone is large, the elongations of an edge monofilament and a central monofilament are different, thereby causing image geometric distortion.

In addition, when CsI is selected as material of a phosphor screen, as the thicker the phosphor screen, the more X-rays are absorbed in the screen, and the probability of fluorescence is higher accordingly. However, as the thickness of the phosphor screen is increased, the probability of fluorescence penetrating through the screen is reduced and the imaging resolution is reduced. For a high-resolution imaging requirement of a system, a thin phosphor screen is usually selected to obtain a high resolution at the expense of brightness.

It can be determined from the above that although an imaging method using a mode of directly coupling a light cone array to a camera in the related art may obtain a certain resolution, the taper ratio of a light cone is large, the light transmittance of the light cone is low, and an image is prone to geometric distortion. Although a higher resolution may be obtained by making a thin X-ray phosphor screen on the light cone array, the phosphor transmittance is reduced, and the image brightness and contrast are reduced.

In the embodiment of the present application, the light transmittance is increased, the image geometric distortion is reduced, and the image resolution is improved by connecting a large light cone and a small light cone in series to form a series light cone array. An imaging unit is formed by coupling the series light cone array to an enhanced CCD. The enhanced CCD is formed by coupling an image enhancer and a CCD camera. A plurality of imaging units are combined and spliced to form a large-field-of-view imaging array, and a CSI phosphor screen is coupled to the front end of the system finally.

Figure 1:
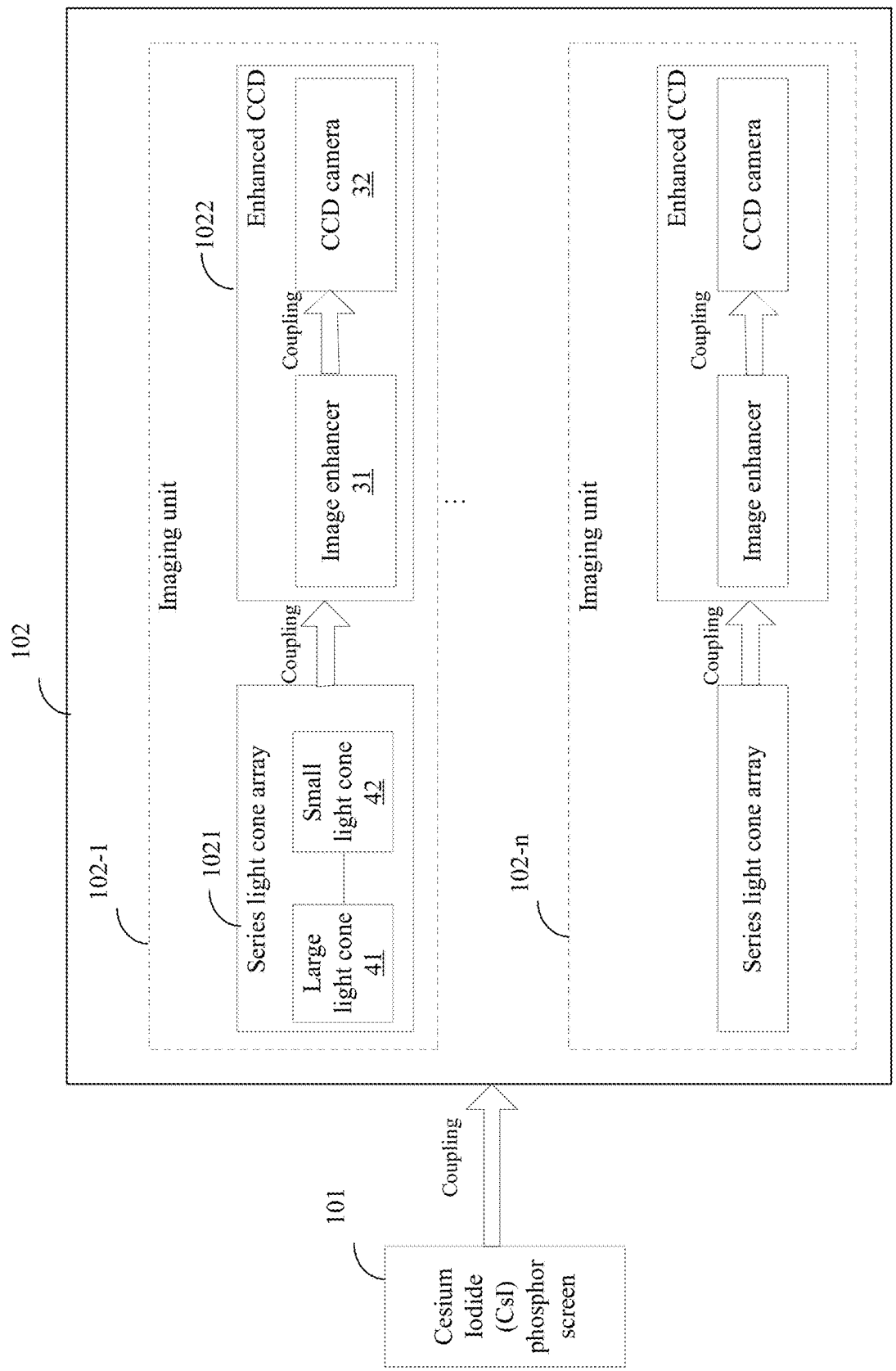
FIG. 1 is a schematic structural diagram of an imaging device according to an embodiment of the present application.

FIG. 1 is a schematic structural diagram of an imaging device according to an embodiment of the present application. As shown in FIG. 1, the imaging device provided by the embodiment of the present application includes: a CSI phosphor screen 101 and an imaging array 102. The imaging array 102 includes: a plurality of imaging units 102-1 to 102-n. The n imaging units are spliced to form the imaging array 102. For example, the imaging units may be arranged and spliced according to a volume size of an object to be measured, so as to form an imaging field of view corresponding to the object to be measured.

Each imaging unit includes a series light cone array (i.e., an array of light cones in series) 1021 and an enhanced CCD 1022. The enhanced CCD 1022 includes an image enhancer 31 and a CCD camera 32. The array of the light cones in series 1021 is formed by connecting a large light cone 41 and a small light cone 42 in series. A small end face of the large light cone 41 is connected with a large end face of the small light cone 42 in series. A large end face of the large light cone is attached to the CSI phosphor screen 101. A small end face of the small light cone 42 serves as an input window of the image enhancer 31.

Figure 2:
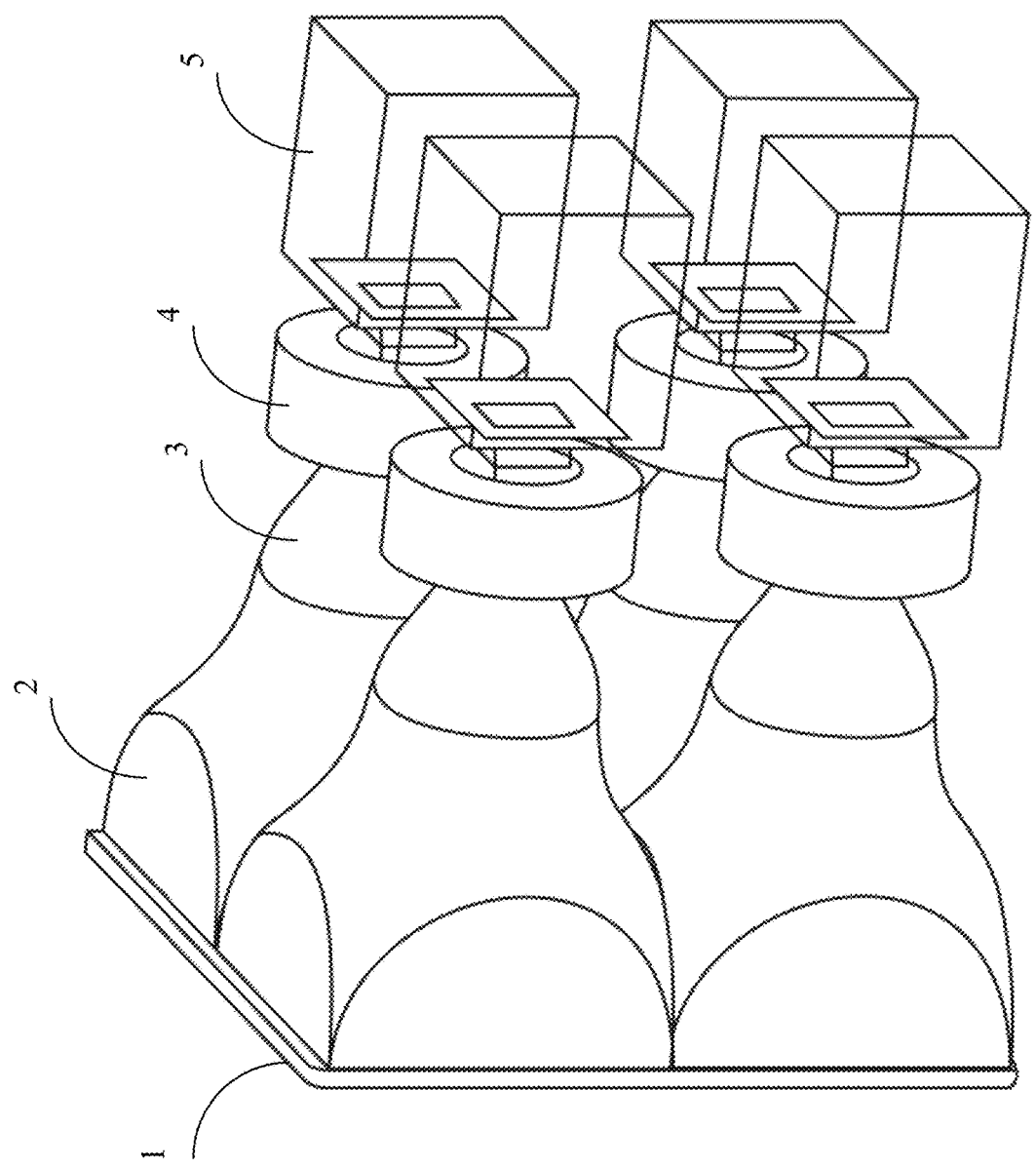
FIG. 2 is a schematic diagram of a three-dimensional visualization model of an imaging device according to an embodiment of the present application.

FIG. 2 is a schematic diagram of a three-dimensional visualization model of an imaging device according to an embodiment of the present application. The device is formed by combining and arranging four imaging units. Each imaging unit includes a large light cone 2, a small light cone 3, an image enhancer 4, and a CCD camera 5. The four imaging units are spliced to form an imaging array, and a CSI phosphor screen 1 is coupled to a front end of a light cone of the imaging array to form a large-field-of-view imaging device. In practical applications, the imaging units may be arbitrarily arranged and spliced according to the volume size of the object to be measured, and the imaging field of view is expanded to form an imaging field of view of an arbitrary size. The imaging field of view can be spliced by any number of imaging units such as 2*2 or 3*3.

An imaging device provided by an embodiment of the present application includes: an imaging array formed by splicing and combining a plurality of imaging units and a CSI phosphor screen. Each imaging unit is formed by coupling a series light cone array and an enhanced CCD.

The series light cone array is configured to conduct an optical signal and formed by connecting a large light cone and a small light cone in series, a small end face of the large light cone is connected with a large end face of the small light cone in series, a large end face of the large light cone is attached to the CSI phosphor screen, and a small end face of the small light cone serves as an input window of an image enhancer.

The enhanced CCD is formed by coupling the image enhancer for increasing detection efficiency, reducing X-ray dose, and improving image brightness and contrast, and a CCD camera for converting the optical signal into an electrical signal and storing imaging information in the form of a digital signal, and a photosensitive screen of the CCD camera serves as an output window of the image enhancer.

The following is a detailed description:

1. Imaging Unit Design

An imaging unit is formed by coupling a series light cone array to an enhanced CCD.

(1) Series Light Cone Array

Since a CCD camera chip of an imaging device has a small photosensitive area, the diameter of a small end face of a light cone coupled thereto is small, the diameter of a large end face is large, and the taper ratio is over-large due to coupling of a single light cone. According to the propagation theory of a conical fiber, for a certain light cone material, under the condition that its core material absorption loss and internal reflection loss are certain, the transmittance of the light cone is reduced with the increase of the taper ratio of the light cone. Reducing the taper ratio of the light cone is beneficial to improve the transmittance of the light cone, reduce the image distortion, and improve the image resolution.

In an embodiment of the present application, a method for series connection of light cones is adopted to solve the image distortion problem caused by too large taper ratio of a single light cone, two light cones with small taper ratio are used for series combination, and the system with single light cone is changed into a series light cone array composed of large light cones and small light cones in series. The amplification ratio formed by the series light cone array is the same as that achieved by the single single cone. a small light cone is connected in series behind the small end face of each large light cone, and the small end face of the large light cone and the large end face of the small light cone have the same size, so that the two light cones are accurately attached, a joint gap is minimized, and after reinforcing and fixing, the joint is vacuumized, to form a series light cone array. Using two light cones with a smaller taper ratio to combine in series can keep the overall image magnification unchanged, while reduce the taper ratio of each light cone, thereby reduce energy loss, improve the transmittance of light cone, and reduce image distortion.

(2) Coupling Of Image Enhancer to CCD Camera

An image enhancer may increase the detection efficiency and enhance the image brightness and contrast. By coupling the image enhancer to a CCD camera, the sensitivity of the CCD camera can be improved, and an enhanced CCD with a high gain, a high signal-to-noise ratio and a large dynamic range can be obtained. In the embodiment of the present application, the image enhancer is coupled to the CCD camera. In order to ensure the system resolution, the embodiment of the present application directly takes a photosensitive screen of the CCD camera as an output window of the image enhancer, omits a relay coupling device, improves the conversion efficiency, and meets the requirement of high-resolution imaging.

(3) Coupling Of Series Light Cone Array to Enhanced CCD

By coupling the series light cone array to the enhanced CCD, the conversion efficiency can be improved, the image brightness and contrast can be enhanced, high-resolution imaging can be achieved with only a small energy X-ray, and clear imaging can also be obtained under weak light. In order to improve the resolution of the system, a fiber material of the small end face of the small light cone is directly used as an input window of the image enhancer, so that the light loss at a coupling part is reduced, and the transmittance is improved.

2. Large-Field-Of-View Imaging Device

A plurality of imaging units are spliced and combined into an imaging array, and a CSI phosphor screen is coupled to a front end of a light cone of the imaging array to form a large-field-of-view imaging device.

(1) Splicing Combination of Imaging Units

Each imaging unit is leveled vertically and horizontally according to the large end face of the light cone to be spliced and fixed to form a spliced imaging array. The imaging units may be arbitrarily arranged and spliced according to a volume size of an object to be measured, to expand an imaging field of view.

(2) Coupling Of CSI Phosphor Screen to Imaging Array

In order to achieve the requirement of high-resolution imaging, CSI which can reduce the phosphor diffusion is selected as a phosphor screen material. The imaging array is fixed by using a metal frame. The phosphor screen is embedded into the metal frame. The joint is vacuumized, and accurately attached to the large end face of the light cone and then reinforced.

The working flow of the imaging device provided by the embodiment of the present application is as follows:

(1) An X-ray is emitted by a micro-focus ray source, passes through a CSI phosphor screen, and nucleates with atoms or molecules in the phosphor screen, and the atoms or molecules are excited to generate visible light.

(2) The visible light conducts an optical signal through an optical fiber in a series light cone array, and an incident image is transmitted from one end of the series light cone array to the other end.

(3) The optical signal multiplies photoelectrons by an image enhancer, thereby improving conversion efficiency and sensitivity, and enhancing image brightness and contrast.

(4) A photosensitive chip of an area array CCD camera completes the conversion from the optical signal to an electrical signal, and the enhanced optical signal is converted into the electrical signal by a high-resolution CCD array, and imaging information is stored in the form of a digital signal. Images obtained by the CCD array are spliced to obtain a large-field-of-view and high-resolution imaging result.

In summary, the embodiment of the present application has the following advantageous effects:

1. By connecting the small end face of the large light cone in series with the large end face of the small light cone, the light cones are coupled in series to increase the light transmittance, reduce the image distortion, and improve the image resolution.

2. The enhanced CCD is formed by coupling the image enhancer to the CCD camera, thereby increasing the image brightness and contrast, and improving the conversion efficiency and sensitivity. By coupling the series light cone array to the enhanced CCD, high-resolution imaging can be obtained with only a small energy X-ray.

3. The imaging units may be arbitrarily arranged and spliced according to the volume size of the object to be measured, and the imaging field of view is expanded to form an imaging field of view of an arbitrary size.

The above description is a preferred embodiment of the present application and not intended to limit the scope of the present application. Any modifications, equivalent substitutions, improvements, etc. made within the spirit and principles of the technical solution of the present application should be included within the scope of protection of the present application.

The invention claimed is:

1. A large-field-of-view high-resolution imaging device, comprising:
   an imaging array formed by splicing and combining a plurality of imaging units and a Cesium Iodide (CsI) phosphor screen, wherein each imaging unit is formed by coupling an array of light cones in series (series light cone array) and an enhanced Charge Coupled Device (CCD);
   the series light cone array is configured to conduct an optical signal and formed by connecting a large light cone and a small light cone in series, a small end face of the large light cone is connected with a large end face of the small light cone in series, a large end face of the large light cone is attached to the CsI phosphor screen, and a small end face of the small light cone serves as an input window of an image enhancer; and
   the enhanced CCD is formed by coupling the image enhancer for increasing detection efficiency and improving image brightness and contrast, and a CCD camera for converting the optical signal into an electrical signal and storing imaging information in the form of a digital signal, and a photosensitive screen of the CCD camera serves as an output window of the image enhancer.

2. The device of claim 1, the device further comprising: a metal frame being fixed to an end of the imaging array coupled to the CsI phosphor screen which is embedded into the metal frame.

3. The device of claim 1, wherein the plurality of imaging units are spliced and combined at a rear end of the CsI phosphor screen.

4. The device of claim 1, wherein the number of the imaging units is determined according to a volume size of an object to be measured.

5. The device of claim 2, wherein the number of the imaging units is determined according to a volume size of an object to be measured.

6. The device of claim 3, wherein the number of the imaging units is determined according to a volume size of an object to be measured.

7. The device of claim 1, wherein the plurality of imaging units are arranged and spliced according to a volume size of an object to be measured, so as to form an imaging field of view corresponding to the object to be measured.

8. The device of claim 2, wherein the plurality of imaging units are arranged and spliced according to a volume size of an object to be measured, so as to form an imaging field of view corresponding to the object to be measured.

9. The device of claim 3, wherein the plurality of imaging units are arranged and spliced according to a volume size of an object to be measured, so as to form an imaging field of view corresponding to the object to be measured.

* * * * *